US008750809B2

(12) United States Patent
Bremer et al.

(10) Patent No.: US 8,750,809 B2
(45) Date of Patent: Jun. 10, 2014

(54) MOBILE WIRELESS COMMUNICATIONS DEVICE WITH SELECTIVELY CONTROLLED ANTENNA AND FILTER SWITCHES AND RELATED METHODS

(75) Inventors: Brian Bremer, Arlington Heights, IL (US); Athena Hart, Huntley, IL (US)

(73) Assignee: BlackBerry Limited, Waterloo, Ontario (CA)

(*) Notice: Subject to any disclaimer, the term of this patent is extended or adjusted under 35 U.S.C. 154(b) by 536 days.

(21) Appl. No.: 13/197,166

(22) Filed: Aug. 3, 2011

(65) Prior Publication Data
US 2013/0035045 A1   Feb. 7, 2013

(51) Int. Cl.
*H04B 1/44* (2006.01)

(52) U.S. Cl.
USPC .............................................. 455/78; 455/73

(58) Field of Classification Search
CPC .......... H04B 1/406; H04B 1/005; H04B 1/48; H04B 15/00; H04B 1/0057; H04B 1/006; H04B 1/0475; H04B 1/40; H04B 1/44; H04B 1/525; H04B 1/54; H04W 88/06; H04W 16/14; H04W 36/0066; H04W 84/12
USPC ......................................... 455/73, 77, 78, 83
See application file for complete search history.

(56) References Cited

U.S. PATENT DOCUMENTS

| | | | |
|---|---|---|---|
| 6,289,204 B1 | 9/2001 | Estes et al. | 455/78 |
| 6,570,467 B2 | 5/2003 | Walker et al. | 333/134 |
| 6,633,748 B1* | 10/2003 | Watanabe et al. | 455/78 |
| 6,721,562 B2* | 4/2004 | Kelley | 455/434 |
| 6,912,406 B2* | 6/2005 | Lahlum et al. | 455/553.1 |
| 7,283,795 B2 | 10/2007 | Matsuura | 455/180.2 |
| 7,349,717 B2* | 3/2008 | Block et al. | 455/552.1 |
| 7,920,833 B2* | 4/2011 | Qiao et al. | 455/78 |
| 7,949,363 B2* | 5/2011 | Sliva | 455/552.1 |
| 2003/0199271 A1* | 10/2003 | Watanabe et al. | 455/424 |
| 2004/0052272 A1* | 3/2004 | Frank | 370/458 |
| 2004/0087280 A1* | 5/2004 | Watanabe et al. | 455/83 |
| 2005/0245201 A1* | 11/2005 | Ella et al. | 455/78 |
| 2005/0245202 A1* | 11/2005 | Ranta et al. | 455/78 |
| 2006/0030355 A1* | 2/2006 | Kemmochi et al. | 455/552.1 |
| 2007/0021066 A1* | 1/2007 | Dravida et al. | 455/41.2 |
| 2007/0060055 A1* | 3/2007 | Desai et al. | 455/41.2 |

(Continued)

OTHER PUBLICATIONS

"Band Class Specification for cdma2000 Spread Spectrum Systems," 3rd Generation Partnership Project 2, Version 1.0, Dec. 22, 2005, 6 pages.

(Continued)

*Primary Examiner* — Lewis West
(74) *Attorney, Agent, or Firm* — Allen, Dyer, Doppelt, Milbrath & Gilchrist, P.A.

(57) ABSTRACT

A mobile wireless communications device may include transmit paths operating on respective different frequency bands, an antenna, and an antenna switch between the transmit paths and the antenna. The device may include a harmonic filter attenuating a harmonic frequency of a first frequency band of a first transmit path, and also attenuating a second frequency band of a second transmit path; a filter switch between the harmonic filter and the antenna; and a processor. The processor may selectively control the antenna switch and the filter switch so that when the antenna switch couples the first transmit path to the antenna, the filter switch couples the harmonic filter to the antenna, and when the filter switch couples the second transmit path to the antenna, the filter switch decouples the harmonic filter from the antenna.

21 Claims, 4 Drawing Sheets

(56) References Cited

U.S. PATENT DOCUMENTS

| | | | |
|---|---|---|---|
| 2007/0082622 A1* | 4/2007 | Leinonen et al. | 455/78 |
| 2008/0136559 A1 | 6/2008 | Takahashi et al. | 333/167 |
| 2008/0299932 A1* | 12/2008 | Belogolovy et al. | 455/296 |
| 2009/0017775 A1 | 1/2009 | Qiao et al. | 455/78 |
| 2010/0164504 A1 | 7/2010 | Bradley | 324/520 |
| 2010/0189190 A1* | 7/2010 | Youtz et al. | 375/285 |
| 2010/0260082 A1 | 10/2010 | Lum et al. | |
| 2011/0165848 A1* | 7/2011 | Gorbachov et al. | 455/78 |
| 2013/0003783 A1* | 1/2013 | Gudem et al. | 375/140 |

OTHER PUBLICATIONS

Bremer et al., U.S. Appl. No. 61/421,991, filed Dec. 10, 2010 (cited application is stored in the USPTO's IFW system).

* cited by examiner

MOBILE WIRELESS COMMUNICATIONS DEVICE WITH SELECTIVELY CONTROLLED ANTENNA AND FILTER SWITCHES AND RELATED METHODS

TECHNICAL FIELD

This application relates to the field of communications, and more particularly, to wireless communications systems and related methods.

BACKGROUND

Cellular communication systems continue to grow in popularity and have become an integral part of both personal and business communications. Cellular telephones allow users to place and receive phone calls most anywhere they travel. Moreover, as cellular telephone technology is advanced, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the Internet via a cellular network and/or a wireless local area network (WLAN), for example.

Cellular devices have radio frequency (RF) processing circuits and receive or transmit radio communications signals typically using modulation schemes. The typical cellular device may have multiple transmit and receive pathways from the antenna to a digital signal processor (DSP). In particular, each signal pathway may comprise a filter to help isolate the desired frequency band from extraneous electromagnetic signals, for example, noise and interference.

Nevertheless, as frequency bands change because of regulatory reasons, expansion, etc., it may be problematic to change the components of the cellular device to utilize the new bandwidth. For example, redesigning filters and power amplifiers to use the new bandwidth may incur greater complexity and cost. Another potential design hurdle encountered when expanding a cellular device's bandwidth is newly created self-interference. For example, the harmonic frequencies of the newly used bandwidth may create problems for other frequency bands used in the cellular device, thereby inhibiting their operation.

DETAILED DESCRIPTION

Figure 1:
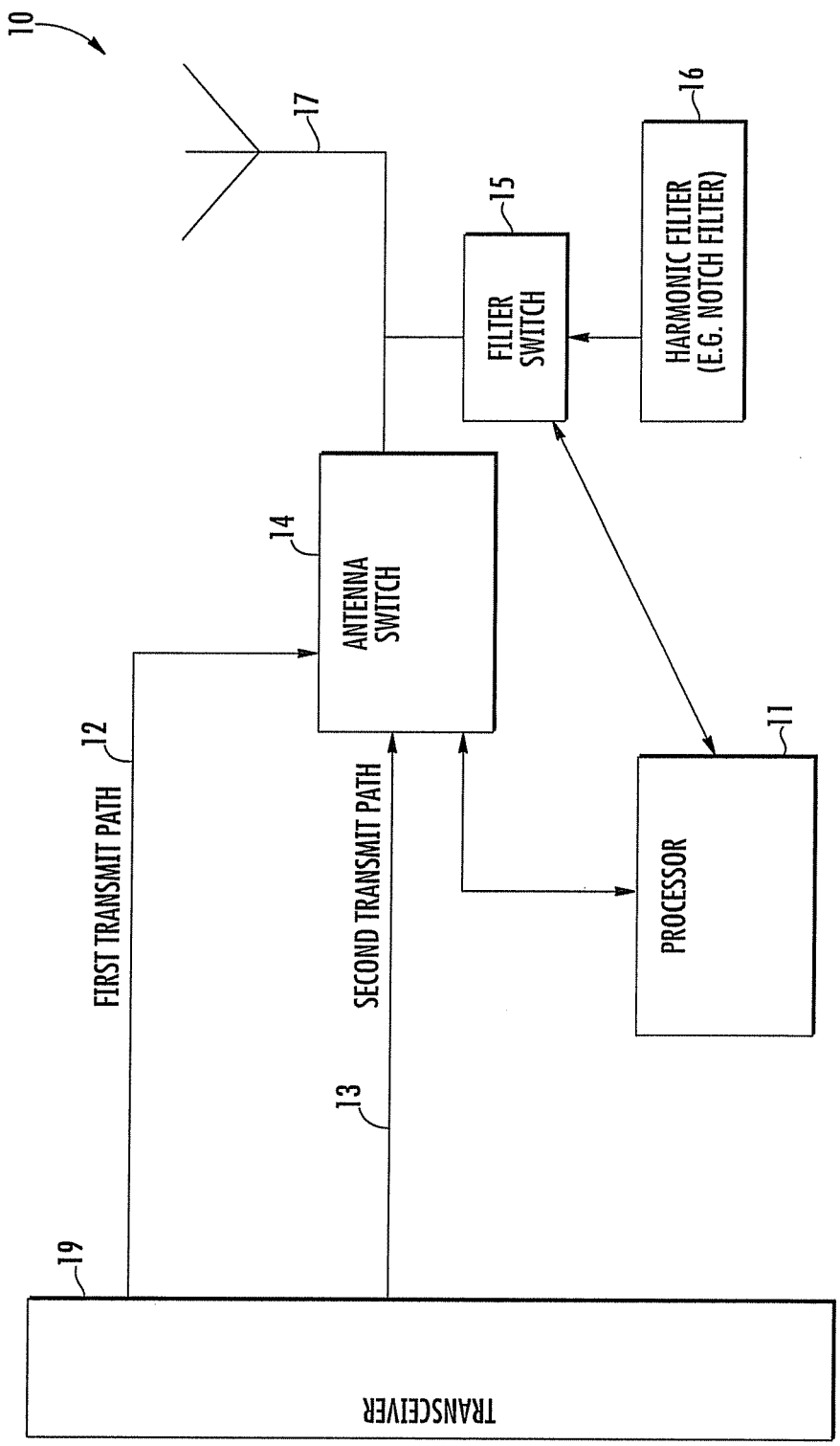
FIG. 1 is a schematic diagram of an example embodiment of a mobile wireless communications device.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Speaking generally, a mobile wireless communications device may include a plurality of transmit paths operating on respective different frequency bands, an antenna, an antenna switch between the plurality of transmit paths and the antenna, and a harmonic filter configured to attenuate a harmonic frequency of a first frequency band of a first transmit path and to also attenuate a second frequency band of a second transmit path. The mobile wireless communications device may also include a filter switch between the harmonic filter and the antenna, and a processor configured to selectively control the antenna switch and the filter switch so that when the antenna switch couples the first transmit path to the antenna, the filter switch couples the harmonic filter to the antenna, and when the filter switch couples the second transmit path to the antenna, the filter switch decouples the harmonic filter from the antenna.

More specifically, the mobile wireless communications device may further comprise a receive path operating on a third frequency band including the harmonic frequency of the first frequency band of the first transmit path. The receive path may comprise a wireless local area networking (WLAN) receive path configured to operate on the third frequency band comprising a WLAN frequency band.

For example, the harmonic filter may comprise an LC filter configured to be resonant at the harmonic frequency of the first frequency band of the first transmit path. Also, the harmonic filter may comprise a notch filter. Each transmit path of the plurality thereof may comprise a transmitter, a power amplifier coupled downstream from the transmitter, and a duplex filter coupled downstream from the power amplifier.

In some embodiments, the mobile wireless communications device may further comprise a plurality of receivers, each coupled to a respective duplex filter. For example, the first transmit path may be configured to operate on the first frequency band comprising a cellular band class 10 block frequency band. Also, the second transmit path may be configured to operate on the second frequency band comprising a personal communication service (PCS) frequency band.

Another aspect is directed to a method of operating a mobile wireless communications device comprising a plurality of transmit paths operating on respective different frequency bands, an antenna, a harmonic filter to attenuate a harmonic frequency of a first frequency band of a first transmit path and also to attenuate a second frequency band of a second transmit path. The method may include selectively controlling an antenna switch and a filter switch so that when the antenna switch couples the first transmit path to the antenna, the filter switch couples the harmonic filter to the antenna, and when the filter switch couples the second transmit path to the antenna, the filter switch decouples the harmonic filter from the antenna.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

Referring now to FIG. 1, an example embodiment of the mobile wireless communications device 10 according to the present disclosure is now described. The mobile wireless communications device 10 illustratively includes first and second transmit paths 12, 13 operating on respective different frequency bands. For example, the first transmit path 12 may be configured to operate on a first frequency band comprising a cellular band class 10 block frequency band (817-894

MHz). Also, the second transmit path 13 may be configured to operate on a second frequency band comprising the PCS frequency band (1850-1910 MHz and 1930-1990 MHz).

The mobile wireless communications device 10 illustratively includes an antenna 17, and an antenna switch 14 between the transmit paths 12, 13 and the antenna. Additionally, the mobile wireless communications device 10 illustratively includes a harmonic filter 16 (e.g. notch filter) configured to attenuate a harmonic frequency of the first frequency band of the first transmit path 12. For example, when the first frequency band comprises 817-894 MHz, a third harmonic of the lowest channel (817 MHz) comprises 2451 MHz. As discussed below, in PCS embodiments, this may be problematic.

The mobile wireless communications device 10 illustratively includes a filter switch 15 between the harmonic filter 16 and the antenna 17. For example, the filter switch 15 may comprise a single pole-single throw switch.

The mobile wireless communications device 10 illustratively includes a processor 11 configured to selectively control the antenna switch 14 and the filter switch 15 so that when the antenna switch couples the first transmit path 12 to the antenna 17, the filter switch couples the harmonic filter 16 to the antenna. In other words, during operation of the first transmit path 12, the processor 11 closes the filter switch 15 to cause the harmonic filter 16 to reduce the effect of the harmonic frequencies from the first transmit path.

Moreover, the mobile wireless communications device 10 illustratively includes a processor 11 configured to selectively control the antenna switch 14 and the filter switch 15 so that the filter switch couples the second transmit path 13 to the antenna, the filter switch decouples the harmonic filter 16 from the antenna. As will be appreciated by those skilled in the art, the harmonic filter 16 may necessarily also attenuate the second frequency band of the second transmit path 13. Advantageously, the processor 11 decouples the harmonic filter 16 and may avoid the undesirable loss in the second frequency band. Also, the mobile wireless communications device 10 illustratively includes a transceiver 19 coupled upstream the first and second transmit paths 12, 13 and configured to generate signals for subsequent transmission.

Figure 2:
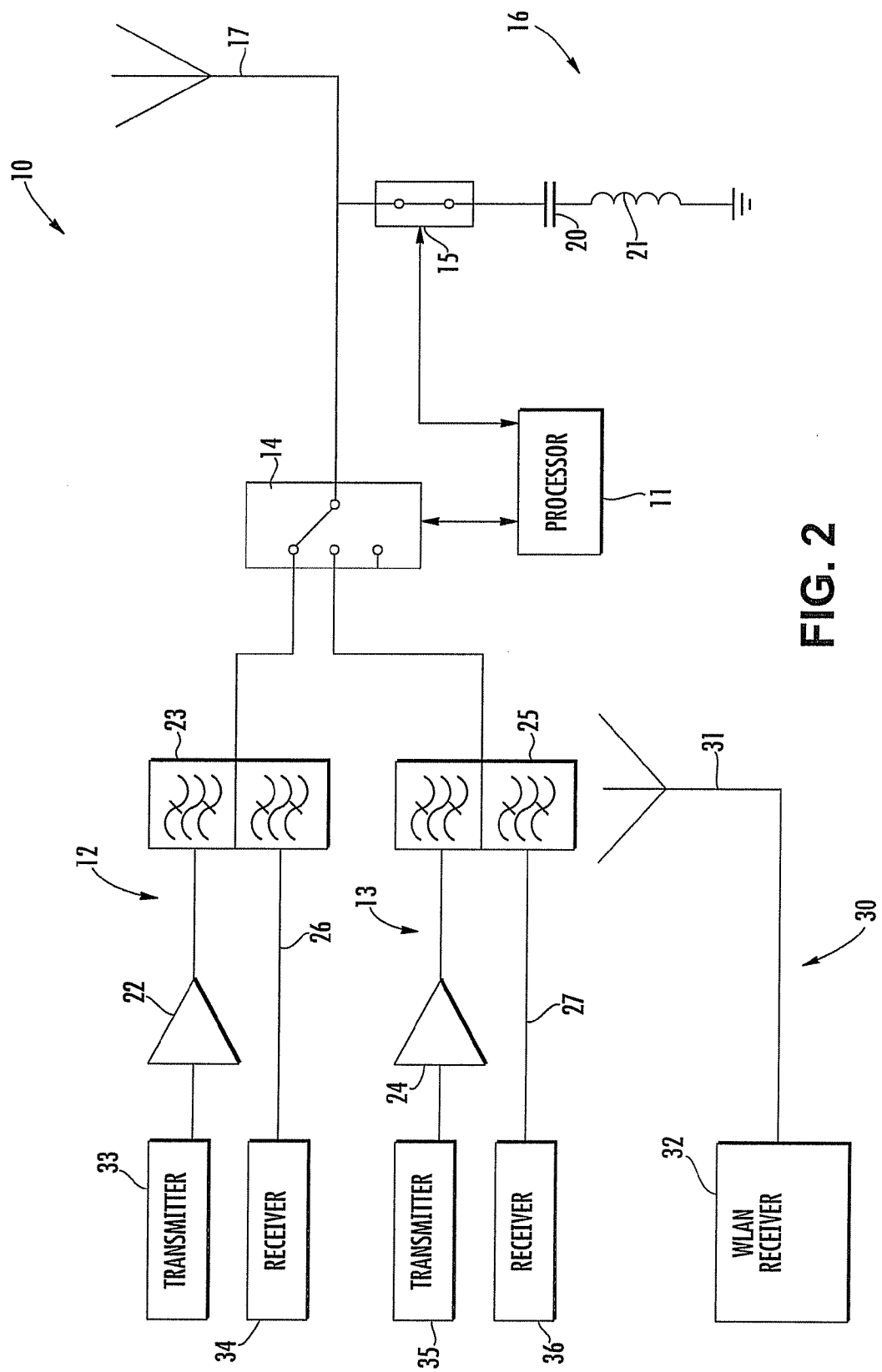
FIG. 2 is a detailed schematic diagram of the mobile wireless communications device of FIG. 1.
Figure 3:
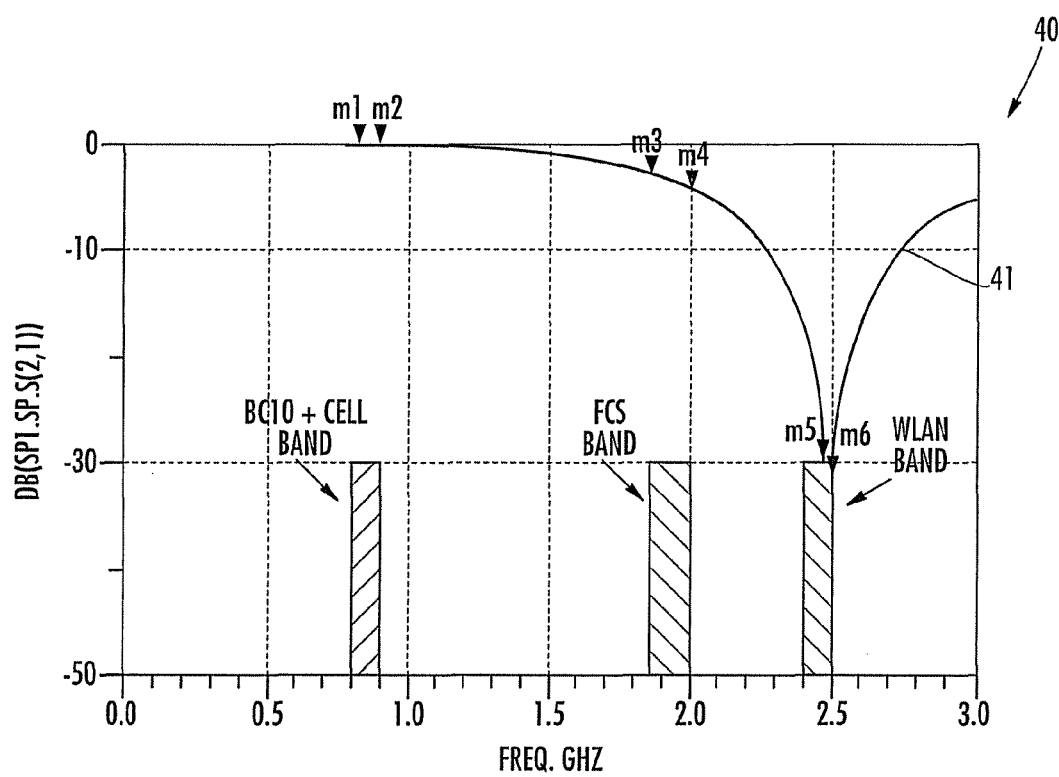
FIG. 3 is a diagram of the transfer characteristics of the harmonic filter from the mobile wireless communications device of FIG. 2.
Figure 4:
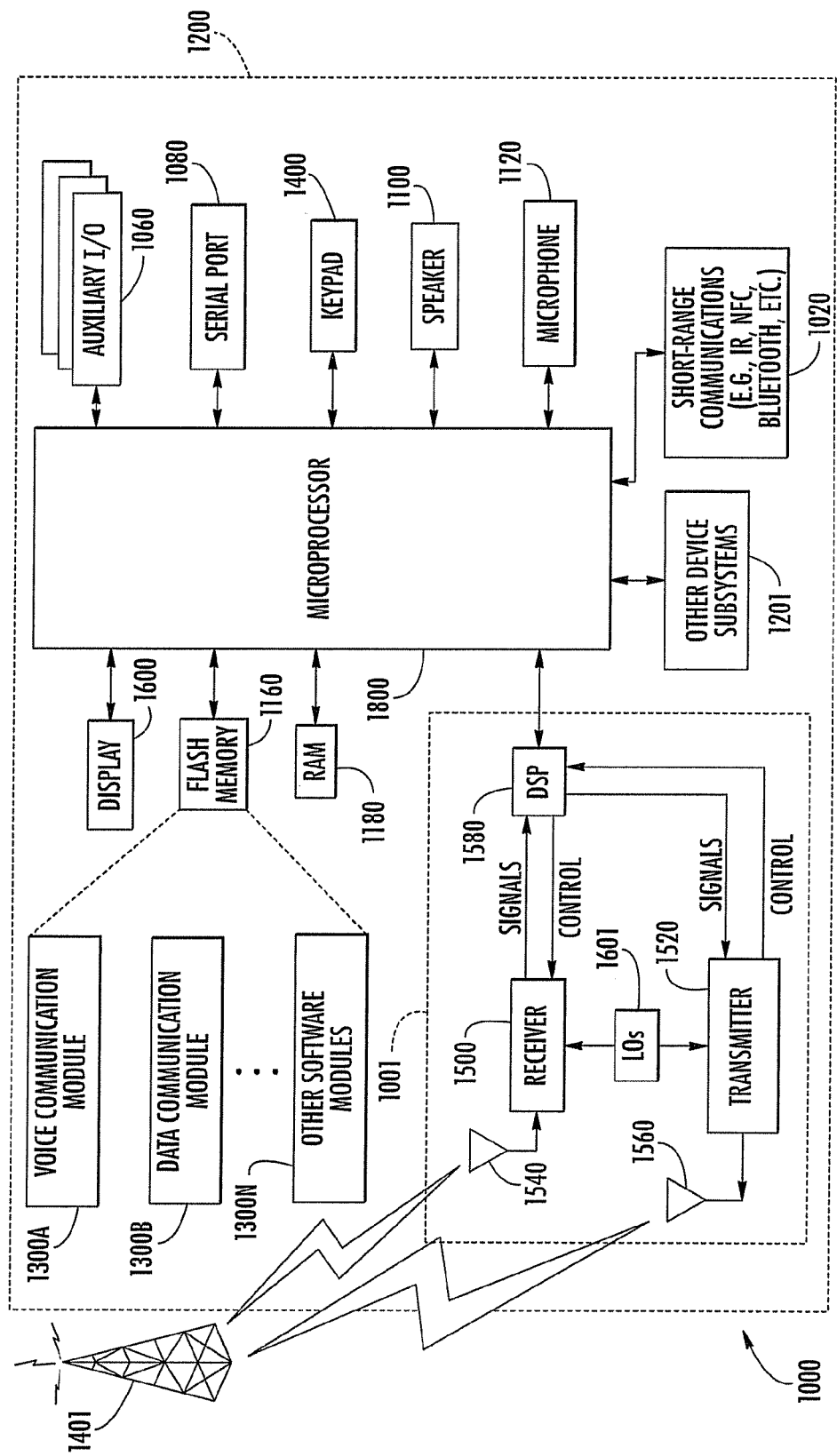
FIG. 4 is a schematic block diagram illustrating example components of a mobile wireless communications device that may be used with the mobile wireless communications devices of FIGS. 1-2.

Referring now additionally to FIG. 2, the mobile wireless communications device 10 illustratively includes a first receive path 26, and a first duplex filter 23 coupling the first transmit 12 and receive paths to the antenna switch 14. The mobile wireless communications device 10 illustratively includes a second receive path 27, and a second duplex filter 25 coupling the second transmit 13 and receive paths to the antenna switch 14. The first transmit and receive paths 12, 26 illustratively operate on the cellular band class 10 block frequency band, and the second transmit and receive paths 13, 27 illustratively operate on the PCS frequency band.

Moreover, in this illustrative embodiment, each transmit path 12, 13 illustratively includes a respective power amplifier 22, 24, and a transmitter 33, 35 upstream from the respective power amplifier. Also, each receive path 26, 27 illustratively includes a respective receiver 34, 36 coupled downstream from the respective duplex filter 23, 25.

Additionally, the harmonic filter 16 illustratively includes an LC filter configured to be resonant at the harmonic frequency of the first frequency band of the first transmit path 12. In particular, the harmonic filter 16 illustratively includes an inductor 21 coupled to a reference voltage potential (ground), and a capacitor 20 coupled to the inductor and the filter switch 15. The mobile wireless communications device 10 further includes a WLAN receive path 30 that illustratively includes a WLAN antenna 31, and a WLAN receiver 32 coupled thereto.

For example, and as shown in diagram 40, the WALN receive path 30 may operate at the third frequency band comprising 2400-2500 MHz. As noted above in certain embodiments, the third harmonic of the first transmit path 12 is 2451 MHz, which is located in the middle of the WLAN band. Of course, this may present substantial operational problems if left uncompensated. As noted above, during operation of the first transmit path 12, the harmonic filter 16 is selectively coupled to the antenna 17 and attenuates this third harmonic frequency.

The transfer function 41 of the harmonic filter 16 is also illustrated, and the attenuation characteristics are shown in Table 1. More specifically, the transfer function 41 provides excellent attenuation at the third harmonic (M5=−29.01 dB).

TABLE 1

| Point | Frequency (MHz) | Loss | Band |
| --- | --- | --- | --- |
| M1 | 817 | −0.238 | Cellular |
| M2 | 894 | −0.298 | Cellular |
| M3 | 1850 | −3.371 | PCS |
| M4 | 1990 | −4.927 | PCS |
| M5 | 2450 | −29.01 | WLAN |
| M6 | 2500 | −31.22 | WLAN |

As discussed above, the harmonic filter 16 provides desirable attenuation at the third harmonic of the first transmit path 12, but also necessarily partly attenuates the PCS bandwidth (M3, M4). The processor 11 avoids this undesired loss by decoupling the harmonic filter 16 during operation of the second transmit path 13, i.e. the PCS transmit path. During operation of the first transmit path 12, the harmonic filter 16 is coupled and rejects the PCS band, including the third harmonic of the cellular band, but efficiently passes the cellular band with little attenuation (M1, M2).

Example components of a mobile wireless communications device 1000 that may be used in accordance with the above-described embodiments are further described below with reference to FIG. 5. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a DSP 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), PCS, GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
   a plurality of transmit paths operating on respective different frequency bands;
   an antenna;
   an antenna switch between said plurality of transmit paths and said antenna;

a harmonic filter configured to attenuate a harmonic frequency of a first frequency band of a first transmit path and to also attenuate a second frequency band of a second transmit path;

a filter switch between said harmonic filter and said antenna; and a processor configured to selectively control said antenna switch and said filter switch so that when said antenna switch couples said first transmit path to said antenna, said filter switch couples said harmonic filter to said antenna, and when said filter switch couples the second transmit path to said antenna, said filter switch decouples said harmonic filter from said antenna.

2. The mobile wireless communications device of claim 1 further comprising a receive path operating on a third frequency band including the harmonic frequency of the first frequency band of said first transmit path.

3. The mobile wireless communications device of claim 2 wherein the receive path comprises a wireless local area networking (WLAN) receive path configured to operate on the third frequency band comprising a WLAN frequency band.

4. The mobile wireless communications device of claim 1 wherein said harmonic filter comprises an LC filter configured to be resonant at the harmonic frequency of the first frequency band of said first transmit path.

5. The mobile wireless communications device of claim 1 wherein each transmit path of said plurality thereof comprises:

a transmitter;

a power amplifier coupled downstream from said transmitter; and a duplex filter coupled downstream from said power amplifier.

6. The mobile wireless communications device of claim 5 further comprising a plurality of receivers, each coupled to a respective duplex filter.

7. The mobile wireless communications device of claim 1 wherein said first transmit path is configured to operate on the first frequency band comprising a cellular band class 10 block frequency band.

8. The mobile wireless communications device of claim 1 wherein the second transmit path is configured to operate on the second frequency band comprising a personal communication service (PCS) frequency band.

9. The mobile wireless communications device of claim 1 wherein said harmonic filter comprises a notch filter.

10. A mobile wireless communications device comprising:

a plurality of transmit paths operating on respective different frequency bands;

an antenna;

an antenna switch between said plurality of transmit paths and said antenna;

a harmonic filter configured to attenuate a harmonic frequency of a first frequency band of a first transmit path and to also attenuate a second frequency band of a second transmit path, the first frequency band comprising a cellular band frequency band;

a filter switch between said harmonic filter and said antenna;

a receive path operating on a third frequency band including the harmonic frequency of the first frequency band of said first transmit path; and a processor configured to selectively control said antenna switch and said filter switch so that when said antenna switch couples said first transmit path to said antenna, said filter switch couples said harmonic filter to said antenna, and when said filter switch couples the second transmit path to said antenna, said filter switch decouples said harmonic filter from said antenna.

11. The mobile wireless communications device of claim 10 wherein the receive path comprises a wireless local area networking (WLAN) receive path configured to operate on the third frequency band comprising a WLAN frequency band.

12. The mobile wireless communications device of claim 10 wherein said harmonic filter comprises an LC filter configured to be resonant at the harmonic frequency of the first frequency band of said first transmit path.

13. The mobile wireless communications device of claim 10 wherein each transmit path of said plurality thereof comprises:

a transmitter;

a power amplifier coupled downstream from said transmitter; and a duplex filter coupled downstream from said power amplifier.

14. The mobile wireless communications device of claim 13 further comprising a plurality of receivers, each coupled to a respective duplex filter.

15. The mobile wireless communications device of claim 10 wherein said first transmit path is configured to operate on the first frequency band comprising a cellular band class 10 block frequency band.

16. The mobile wireless communications device of claim 10 wherein the second transmit path is configured to operate on the second frequency band comprising a personal communication service (PCS) frequency band.

17. A method of operating a mobile wireless communications device comprising a plurality of transmit paths operating on respective different frequency bands, an antenna, a harmonic filter to attenuate a harmonic frequency of a first frequency band of a first transmit path and also to attenuate a second frequency band of a second transmit path, the method comprising:

selectively controlling an antenna switch and a filter switch so that when the antenna switch couples the first transmit path to the antenna, the filter switch couples the harmonic filter to the antenna, and when the filter switch couples the second transmit path to the antenna, the filter switch decouples the harmonic filter from the antenna.

18. The method of claim 17 further comprising operating a receive path on a third frequency band including the harmonic frequency of the first frequency band of the first transmit path.

19. The method of claim 18 further comprising operating the receive path as a wireless local area networking (WLAN) receive path on the third frequency band comprising a WLAN frequency band.

20. The method of claim 17 further comprising operating the first transmit path on the first frequency band comprising a cellular band class 10 block frequency band.

21. The method of claim 17 further comprising operating the second transmit path on the second frequency band comprising a personal communication service (PCS) frequency band.

* * * * *